(12) United States Patent
Watanabe et al.

(10) Patent No.: US 6,299,064 B2
(45) Date of Patent: Oct. 9, 2001

(54) APPARATUS AND METHOD FOR CORRECTING BAR WIDTH, BAR CODE READER, AND METHOD FOR DECODING BAR CODE

(75) Inventors: Mitsuo Watanabe; Motohiko Itoh; Hiroaki Kawai; Isao Iwaguchi, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/815,007

(22) Filed: Mar. 23, 2001

Related U.S. Application Data

(63) Continuation of application No. PCT/JP99/00483, filed on Feb. 4, 1999, now abandoned.

(30) Foreign Application Priority Data

Sep. 28, 1998 (JP) .................................................. 10-273249

(51) Int. Cl.[7] .............................. G06K 7/10; G06K 19/06
(52) U.S. Cl. .................................. 235/462.16; 235/462.19
(58) Field of Search ........................ 235/462.01, 462.16, 235/462.19, 454, 462.14, 435, 437

(56) References Cited

U.S. PATENT DOCUMENTS

| | | |
|---|---|---|
| 5,451,761 | 9/1995 | Kawai et al. ........................ 235/463 |
| 5,502,296 * | 3/1996 | Kawai et al. ..................... 235/462.07 |
| 5,525,784 | 6/1996 | Kawai et al. ........................ 235/437 |
| 5,525,785 | 6/1996 | Kawai et al. ........................ 235/437 |
| 6,032,862 * | 3/2000 | Watanabe et al. .............. 235/462.16 |
| 6,095,420 * | 8/2000 | Kawai et al. .................... 235/462.16 |

FOREIGN PATENT DOCUMENTS

| | | |
|---|---|---|
| 1-156886 | 6/1989 | (JP) . |
| 4-165484 | 6/1992 | (JP) . |
| 6-36065 | 2/1994 | (JP) . |
| 6-337954 | 12/1994 | (JP) . |
| 9-6885 | 1/1997 | (JP) . |

\* cited by examiner

*Primary Examiner*—Karl D. Frech
*Assistant Examiner*—Larry D Taylor
(74) *Attorney, Agent, or Firm*—Armstrong, Westerman, Hattori, McLeland & Naughton, LLP

(57) ABSTRACT

An apparatus for correcting a bar width comprises a detecting section calculating a reference bar width serving as a reference of bar widths, a first calculation section calculating an average value of a plurality of reference bar widths, a second calculation section calculating an error value between a bar width of a bar to be corrected and the reference bar width calculated by the detecting section, and a correcting section correcting the bar width of the bar to be corrected by using the calculated average value when the calculated error value is not less than a predetermined value.

10 Claims, 14 Drawing Sheets

[EXAMPLE] WHEN THE NUMBER OF MODULES OF d BAR IS 1 MODULE

FIG. 12
PRIOR ART

| T1 / T2 | 2 | 3 | 4 | 5 |
|---|---|---|---|---|
| 2 | E6 | 00 | E4 | 03 |
| 3 | 09 | E2 / E8 | 01 / 07 | E5 |
| 4 | E9 | 02 / 08 | E1 / E7 | 05 |
| 5 | 06 | E0 | 04 | E3 |

~61

APPARATUS AND METHOD FOR CORRECTING BAR WIDTH, BAR CODE READER, AND METHOD FOR DECODING BAR CODE

This is a continuation of Application PCT/JP 99/00483 filed on Feb. 4, 1999, now abandoned.

BACKGROUND OF THE INVENTION

1. Field of the Invention

The present invention relates to an apparatus and method for correcting a bar width, a bar code reader, and a method for decoding a bar code.

2. Description of the Related Art

In recent years, as represented by POS systems in distributors, the management of goods or the like is generally performed by bar codes. For example, in a POS system of shops, information such as the type and a price of goods is coded into the format of a bar code, and the bar code is printed on the goods. Thereafter, checkout is performed by reading the bar code on a cash disk, and the number of sold goods are counted on real time. The number of sold goods is used in stock management and buying management.

In order to correctly read a read bar code, the bar width of each of bars constituting the bar code must be correctly recognized. For this reason, some methods for correcting the bar widths of the read bar code are proposed. As one of the problems in the bar width correction, a problem that the bars of the bar code are thickened or thinned by the degradation of print quality of the bar code is known.

A conventional bar width correcting method is effective when the bar widths of a bar code are uniformly thickened or thinned. However, when the bar widths of a bar code are locally thickened or thinned by bending or the like when the bar code is pasted on a curved surface, the bar widths are not effectively corrected, and the bar code may be erroneously read. An example in which bar width correction is not effectively performed will be described below.

As one of bar codes having low print quality, a bar code in which the width of a black bar of the bar code is thickened or thinned. A method in which the influence of uniform thickening or thinning of a black bar caused by printing a bar code is removed by using a delta distance to prevent the bar code from being erroneously read is known.

More specifically, as shown in FIG. 11, with reference to a bar code (see FIG. 11(A)) having normal black bars, when a bar code (see FIG. 11 (B)) having a thick black bar or a bar code (see FIG. 11 (C)) having a thin black bar exists, a black bar portion and a white bar portion of the bar code are read as continuous values so as to detect delta distances T1 and T2. More specifically, the widths of d bar and c bar of each bar code shown in FIG. 11 are detected as the delta distances T1, and the widths of c bar and b bar are detected as the delta distances T2. Thereafter, the number of modules in the delta distances T1 and T2 are detected.

As shown in FIG. 12, a first decoding table 61 in which character values are stored in correspondence with the number of modules of the delta distances T1 and T2 is prepared, and the character values corresponding to the delta distances T1 and T2 are detected from the first decoding table 61, so that the character of the bar code is decided.

When the character is decided by the number of modules of the delta distances T1 and T2, as is apparent from FIG. 12, an odd number "1" (O1) and an odd number "7" (O7) satisfy T1=3 and T2=4. For this reason, O1 cannot be discriminated from O7. Similarly, since an even number "2" (E2) and an even number "8" (E8) satisfy T1=3 and T2=3, E2 and E8 cannot be discriminated from each other.

For this reason, the values of characters are O1 and O7 or E2 and E8, the number of modules of black bars existing in the delta distance T1 is calculated to discriminate the characters from each other. More specifically, the number of modules of the d bar shown in FIG. 11 is calculated. A second decoding table 62 shown in FIG. 13 is prepared, the character value corresponding to the number of modules of the d bar is detected from the second decoding table 62. In this manner, a character is specified.

For example, when a delta distance satisfies T1=3 and T2=4, and the number of modules of d bar is 1, a character value is "O1". When the number of modules of the d bar is 2, a character value is "O7". Similarly, when a delta distance satisfies T1=3 and T2=3, and when the number of modules of d bar is 2, a character value is "E2". When the number of modules of the d bar is 1, the character value is "E8".

As described above, the width of a black bar is thickened or thinned depending on a print state. For this reason, when the number of modules of the black bar is directly calculated, the number of modules may be erroneously calculated. For this reason, in a conventional technique, bar width data of black bars (to be referred to as "X bars") of a character (or any one of guard bars and center bars) immediately before decoding is completed is used on the assumption that the black bars of the bar code are uniformly thickened or thinned, so that the width of d bar is corrected (to be referred to as a "correction decoding process": see Japanese Patent Application Laid-Open (JP-A) No. 6-36065).

More specifically, for example, when correction decoding of a character shown in FIG. 14 is performed in a forward direction (direction from a start guard bar to an end guard bar), the widths (bar width count values) of black bars (b bar and d bar) of a character to be decoded are set to be b1 and b3, respectively, and the bar width data (bar width count value) of an X bar is set to be bv. When the initial values of the bar widths are represented by Bv, B1, and B3, respectively, and when the differences between the ideal values and actual bar widths are represented by $\Delta v$, $\Delta 1$, and $\Delta 3$, respectively, $$Bv = bv + \Delta v \quad \text{Equation (1)}$$

$$B1 = b1 + \Delta 1 \quad \text{Equation (2)}$$

$$B3 = b3 + \Delta 3 \quad \text{Equation (3)}$$

$$\Delta x \approx \Delta 1 \approx \Delta 3 \quad \text{Equation (4)}$$

(assumption) are satisfied. Here, the difference between Bv and B1 and the difference between Bv and B3 are calculated, on the basis of Equation (1) and Equation (2), $$\begin{aligned} Bv - B1 &= (bv + \Delta v) - (b1 + \Delta 1) \\ &= (bv + b1) + (\Delta v - \Delta 1) \\ &\approx bv - b1 \end{aligned} \quad \text{Equation (5)}$$

is satisfied. Similarly, on the basis of Equation (1) and Equation (3), $$Bv - B3 \approx bv - b3 \quad \text{Equation (6)}$$

is satisfied. The Equation (5) and Equation (6) show that an error caused by printing or the like can be removed by calculating a difference between the bar widths of adjacent bars. In this case, when the number of modules of Equation (5) is calculated, the following is satisfied. However, the number of modules is represented as a symbol MOD (bar width count value).

$$MOD(Bv-B1)=MOD(bv-b1) \qquad \text{Equation (5)'}$$

Here, since Bv and B1 represent ideal bar widths, respectively, Bv and B1 can be divided as follows:

$$MOD(Bv-B1)=MOD(Bv)-MOD(B1).$$

Therefore, Equation (5)' is also expressed by:

$$MOD(Bv)-MOD(B1)=MOD(bv-b1)$$

$$\therefore MOD(B1)=MOD(Bv)-MOD(bv-b1) \qquad \text{Equation (5)''}.$$

Equation (5)'' represents that the ideal number of modules MOD (B1) of the d bar is calculated when MOD (bv–b1) is calculated and when MOD (bv–b1) is subtracted from the ideal number of modules MOD (Bv) of the bar X. Similarly, the following equation is satisfied:

$$MOD(B3)=MOD(Bv)-MOD(b-bv),$$

so that the ideal number of modules MOD (B3) of the b bar can be calculated. A character value corresponding to the ideal number of modules MOD (B1) of the d bar is read from the second decoding table 62, and the character value is set as a character value of a character to be decoded.

However, the correction decoding described above is performed on the assumption that the black bars of a bar code are uniformly thickened or thinned. For this reason, when the black bars of the bar code are locally thickened or thinned when the bar code is pasted on a curve surface, the number of modules of the d bar is erroneously calculated, and a character may be erroneously specified.

In this manner, in the conventional bar width correction, a bar width may not be able to be corrected when the bar width is not uniformly thickened or thinned.

SUMMARY OF THE INVENTION

It is an object of the present invention to provide an apparatus and method for correcting a bar width can appropriately correct a bar width even though thickening and thinning of the bar width of a bar code are not uniform.

It is another object of the present invention to provide a bar code reader which suppresses a decoding mistake of a character in a correction decoding process and, thereby, can prevent a bar code from being erroneously read, and a method for decoding a bar code therefor.

The present invention employs the following configuration to accomplish the above objects. More specifically, the first aspect of the present invention is an apparatus for correcting a bar width. The apparatus comprises: a detecting section for calculating a reference bar width serving as a reference of bar widths; a first calculation section for calculating an average value of a plurality of reference bar widths; a second calculation section for calculating an error value between a bar width of a bar to be corrected and the reference bar width calculated by the detecting section; and a correcting section for correcting the bar width of the bar to be corrected by using the calculated average value when the calculated error value is not less than a predetermined value and for correcting the bar width of the bar to be corrected by the calculated reference bar width when the calculated error value is less than the predetermined value.

According to the first aspect, when the error value is not less than the predetermined value, the bar width of the bar to be corrected is corrected by the average value. For this reason, even though the bar widths are not uniformly thickened or thinned, the bar widths can be corrected.

The second aspect of the present invention is a bar code reader comprises: a bar code data detecting section for scanning a bar code having a plurality of characters to detect bar code data; and a decoding section for decoding the bar code data detected by the bar code data detection section every character, the decoding section comprising: a first detecting section for calculating a reference bar width serving as the reference of the width of a bar to be corrected included in a character to be decoded and used in decision of the character in decoding of each character; an second detecting section for calculating an average value of a plurality of reference bar widths; a third detecting section for calculating a precision difference between the reference bar width and the bar width of the bar to be corrected; and a correcting section for correcting the bar width of the bar to be corrected by using the calculated average value when the calculated precision difference is not less than a predetermined value.

According to the second aspect, when the precision difference between the reference bar width and the width of the bar to be corrected is not less than the predetermined value, a correction process for the bar to be corrected is performed by using the average value. For this reason, the precision of correction decoding can be made to be larger than that of a conventional technique, and a bar code can be prevented from being erroneously prevented by a decoding mistake of a character.

The bar code used in the present invention is, e.g., a WPC (EAN code, JAN code, or the like).

BRIEF DESCRIPTION OF THE DRAWINGS

FIG. 12 is a diagram for explaining a first decoding table.

DETAILED DESCRIPTION OF THE PREFERRED EMBODIMENT

The best mode of an embodiment for carrying out the invention will be described below with reference to the drawings.

<Configuration of Bar Code Reader>

Figure 1:
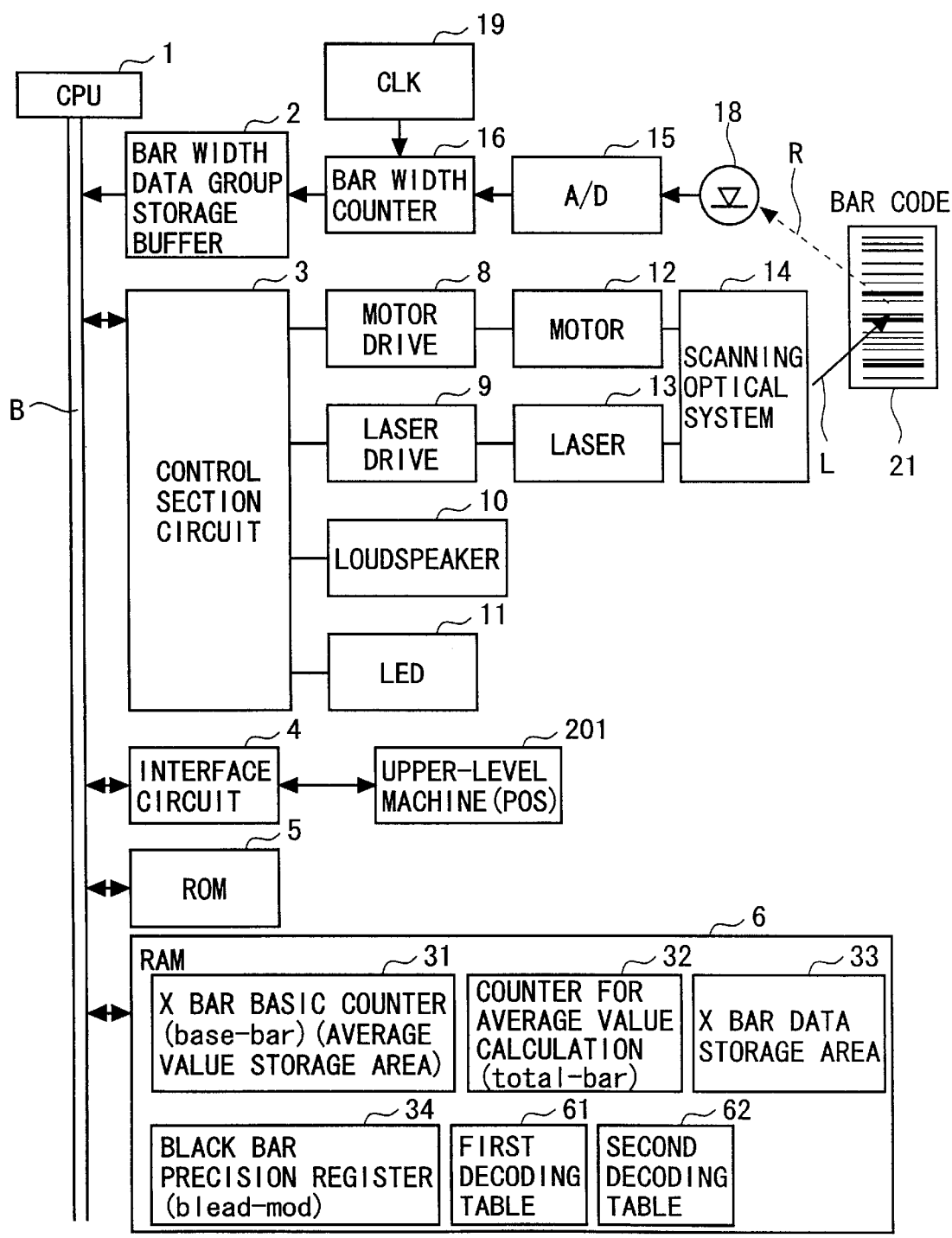
FIG. 1 is a diagram of a bar code reader according to an embodiment of the present invention.

FIG. 1 is a block diagram showing a schematic configuration of a bar code reader including an apparatus for correcting a bar width according to the present invention. The bar code reader reads a bar code 21 according to UPC/A and EAN-13 of WPC code.

Figure 2:
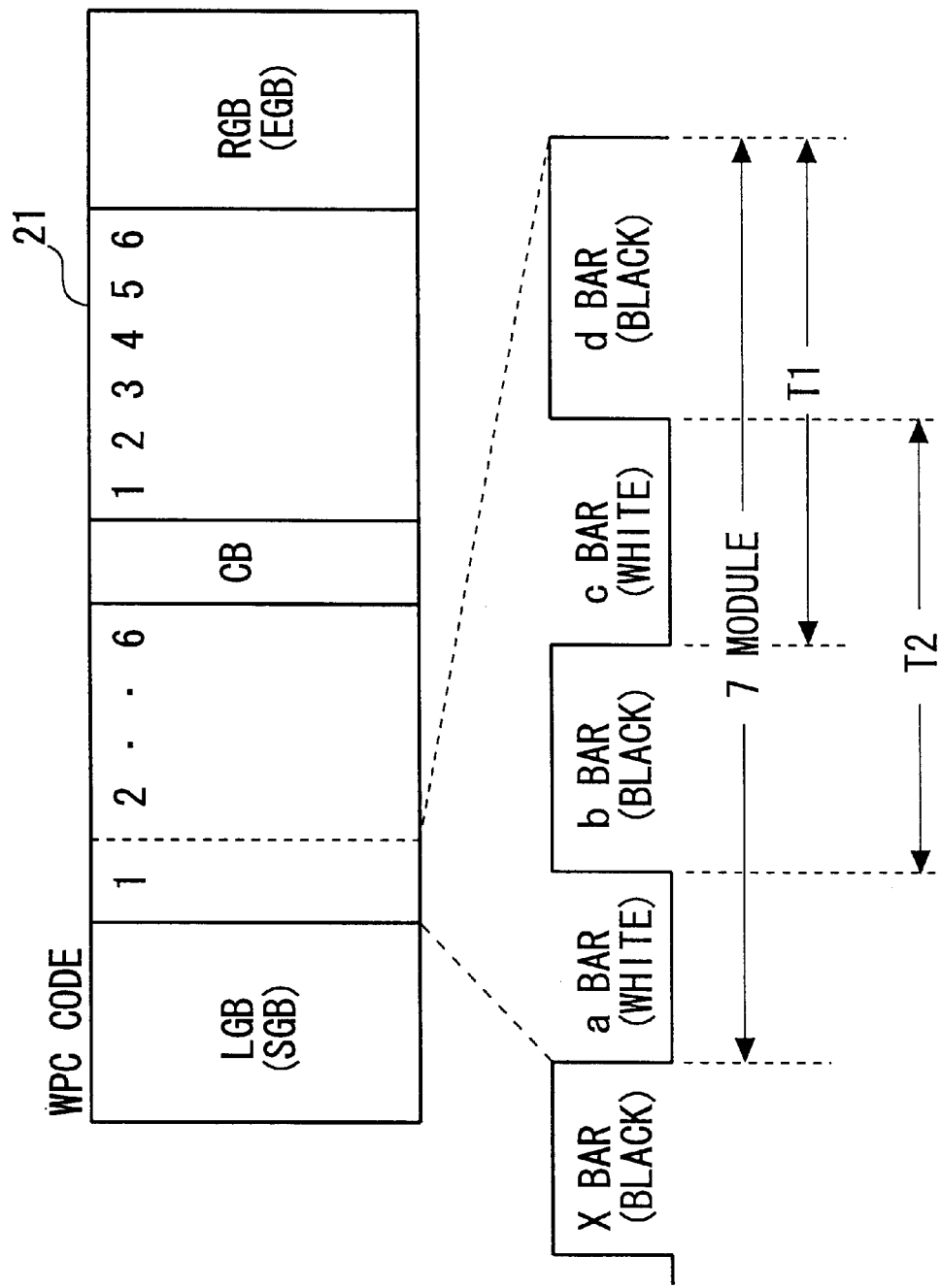
FIG. 2 is a diagram showing an example of the bar code shown in FIG. 1.

FIG. 2 is a diagram showing an example of the bar code 21 shown in FIG. 1. Referring to FIG. 2, the bar code 21 has guard bars, i.e., a start guard bar (SGB: left guard bar (LGB)) and an end guard bar (EGB: right guard bar (RGB)) and a center bar (CB), and has a left data block constituted by 6 characters sandwiched by the SGB and the CB and a right data block constituted by 6 characters sandwiched by the CB and the EGB. Each character is constituted by 7 modules, and each module is constituted by two white bars (a bar and c bar) and two black bars (b bar and d bar). Each black bar is constituted by 1 to 4 modules depending on the value of a character.

In FIG. 1, the bar code reader has a CPU 1, a bar width data storage buffer 2, a control section circuit 3, an interface circuit 4, a ROM 5, and a RAM 6 which are connected to each other through a bus B. The bar code reader has a bar width counter 16 connected to the bar width data storage buffer 2, a clock 19 and an A/D converter 15 which are connected to the bar width counter 16, and a light-receiving element 18 connected to the A/D converter 15. In addition, the bar code reader has a motor drive circuit 8, a laser drive circuit 9, a loudspeaker 10 and an LED 11 connected to the control section circuit 3, a motor 12 connected to the motor drive circuit 8, a scanning optical system 14 driven by the motor 12, and a semiconductor laser 13 connected to the laser drive circuit 9.

The ROM 5 is a read-only memory in which a bar code recognition/decoding process program is stored. The CPU 1 executes the bar code recognition program and the decoding process program stored in the ROM 5 to control the bar code reader as a whole, and decodes bar width data groups obtained by reading the bar code 21 to reproduce data corresponding to the entire bar code 21.

The interface circuit 4 controls the status of the bus B and controls data transmission or the like to an upper level machine (upper level computer) 201.

The control section circuit 3 controls the motor drive circuit 8, the laser drive circuit 9, the loudspeaker 10, and the light-emitting diode (LED) 11. The motor drive circuit 8 drives the motor 12 to rotate polygon mirror (not shown) constituting the scanning optical system 14. The laser drive circuit 9 drives the semiconductor laser 13 to cause the semiconductor laser 13 to emit a laser beam L. The loudspeaker 10 generates sound representing the completion of read (decoding) of the bar code. The light-emitting diode 11 is a display element for displaying information such as information (e.g., the price or the like of goods) obtained as a result of decoding of the bar code 21.

The laser beam L emitted from the semiconductor laser 13 is incident on the scanning optical system 14 and polarized by the scanning optical system 14. More specifically, the scanning optical system 14 polarizes the laser beam L in one direction by the polygon mirror (not shown) rotated by the motor 12. On the opposite side of the polygon mirror, a plurality of fixed mirrors. Therefore, the laser beam L polarized by the polygon mirror is reflected by the respective fixed mirrors again, so that the polarizing direction (scanning direction) of the laser beam is changed into various directions. According to the scanning optical system 14, laser beam scanning traces in a plurality of directions are continuously performed at a high speed within a polarizing cycle obtained by one reflective surface of the polygon mirror. Each of the plurality of laser beam scanning traces performed within the polarizing cycle obtained by one reflective surface of the polygon mirror will be called "one scanning trace" in the following description.

When the scanned laser beam L is incident on the bar code 21, the laser beam L is diffused on the surface, and a part of the reflected light component R is received by the light-receiving element (photodiode) 18. The A/D converter 15 compares a current value representing the brightness of the reflected light component R received by the light-receiving element 18 with a predetermined threshold value, and converts the value into a binary signal. This binary signal represents "H" when the intensity of the reflected light component R corresponds to the reflectance of a black bar in the bar code 21, and represents "L" when the intensity of the reflected light component R corresponds to the reflectance of a white bar in the bar code 21.

The bar width counter 16 measures a time from the leading timing of the binary signal to the trailing timing (expected to correspond to the width of a black bar in the bar code 21) and a time from the leading timing of the binary signal to the trailing timing (expected to correspond to the width of a white bar in the bar code 21) on the basis of the binary signal input from the A/D converter 15.

The bar width counter 16 counts the number of clocks from the clock 19 to measure the times corresponding to the bar widths. The read data (bar code data) of the bars output from the bar width counter 16 has a configuration obtained by combining the count value and a color identification signal representing white or black, and the read data are continuously output every scanning operation of the laser beam. The read data obtained every scanning operation and continuously output in this manner is called a "bar width data group".

The bar width data group is temporarily stored in the bar width data storage buffer 2. The bar width data storage buffer 2 sequentially stores bar width data groups input from the bar width counter 16, and gives the bar width data groups to the CPU 1 one by one in the storage order at a request from the CPU 1.

Figure 13:
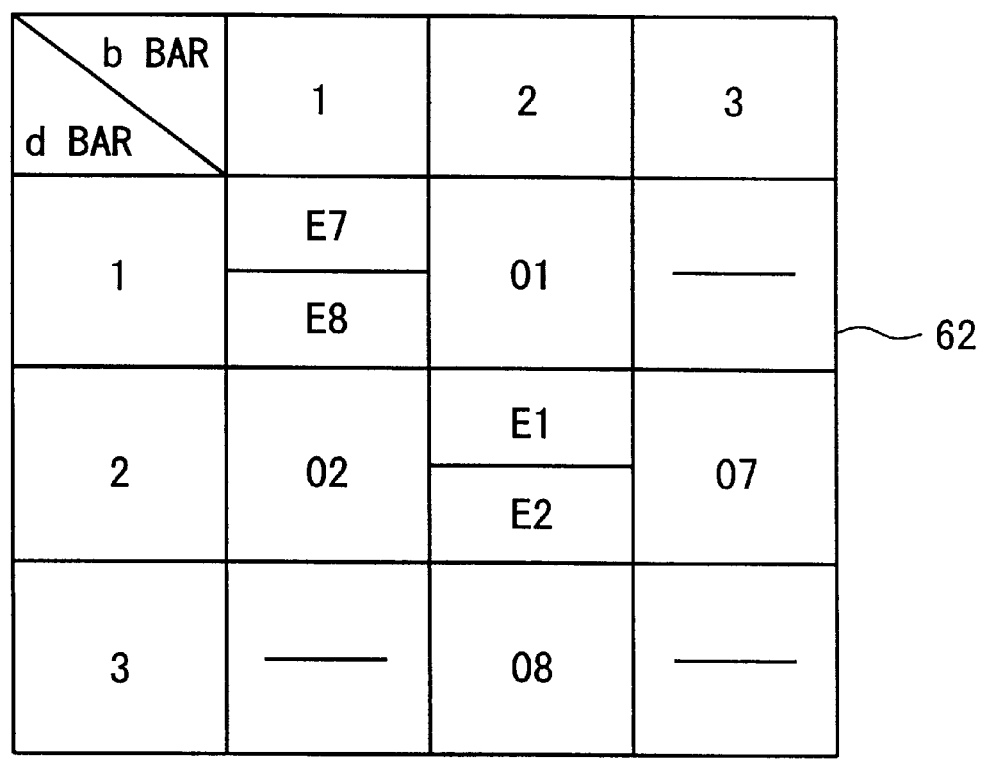
FIG. 13 is a diagram for explaining a second decoding table.

The work area for a bar code recognition process and a bar code decoding process performed by the CPU 1 is developed in the RAM 6. The RAM 4 stores bar code data read from the bar width data storage buffer 2. The RAM 4 holds the decoded bar code data obtained by the bar code decoding process performed by the CPU 1. The RAM 4 has, areas for storing data used in a bar code decoding process (to be described later), an X bar basic counter (base-bar: average value storage area) 31, a counter for average value calculation (total-bar) 32, an X bar data storage area 33, a black bar precision register 34, a first decoding table 61 (see FIG. 12), a second decoding table 62 (see FIG. 13), and the like.

The control section circuit 3, the motor drive circuit 8, the laser drive circuit 9, the motor 12, the semiconductor laser 13, the scanning optical system 14, the A/D converter 15, the bar width counter 16, the light-receiving element 18, the clock 19, and the bar width data storage buffer 2 correspond to the bar code detection section according to the present invention. The CPU 1 functions as a decoding section according to the present invention to realize a reference bar width detection (calculation) section, an average value detection (calculation) section, an error calculation section, a precision difference detection section, a correction section, a delta distance calculation section, a second correction section, and a black bar precision detection section. The first decoding table 61 corresponds to a decoding table according to the present invention, and the second decoding table 62 corresponds to a correction decoding table according to the present invention.

<Bar Code Decoding Process>

Figure 3:
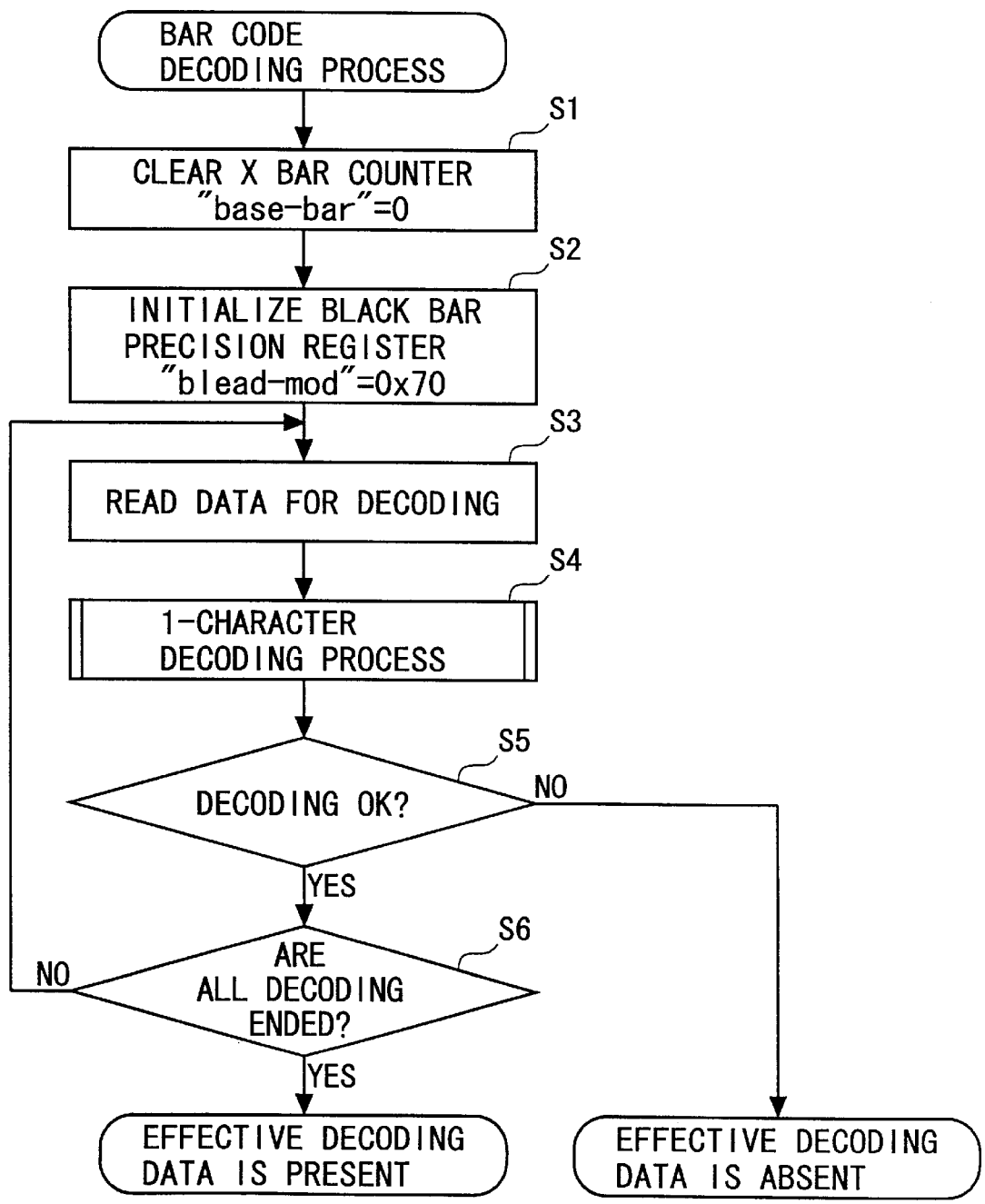
FIG. 3 is a flow chart showing a bar code decoding process performed by the CPU shown in FIG. 1.

The concrete contents of the bar code decoding process program stored in the ROM 5 and executed by the CPU 1 will be described below on the basis of the flow charts FIGS. 3 and 7. FIG. 3 shows the main routine of the bar code decoding process (to be simply referred to as a "decoding process" hereinafter). This main routine is started on the assumption of the following process.

More specifically, for example, when the main power supply of the bar code reader is powered on, the CPU 1 performs a bar code recognition process. In this manner, the bar code 21 is scanned, and the bar width data group is stored in the bar width data storage buffer 2. Thereafter, the CPU 1 reads the bar width data group from the bar width data storage buffer 2, and is stored in a predetermined area of the RAM 6. Subsequently, the CPU 1 calculates the bar width counter values of the SGB, the CB, and the EGB in the bar width data group and the number of modules, sets the bar width counter values and the number of modules as a counter value and the number of modules of an X bar, and stores the counter value and the number of modules in an X bar data storage area in the RAM 6. The numbers of modules of the SGB, CB, and EGB are 1. Thereafter, the CPU 1 starts execution of the main routine.

First, the CPU 1 clears the value of the X bar basic counter (base-bar) 31 in the RAM 6 shown in FIG. 1 (step S1). The CPU 1 initializes the black bar precision register (bleadmod) 34 in the RAM 6 (step S2). The CPU 1 reads data for 1-character decoding process into the work area. The data for 1-character decoding process is constituted by the bar width counter value and the character length of each of the bars a to d constituting a character (see FIG. 2) to be decoded, the bar width counter value of the X bar, and the number of modules of the X bar.

Figure 4:
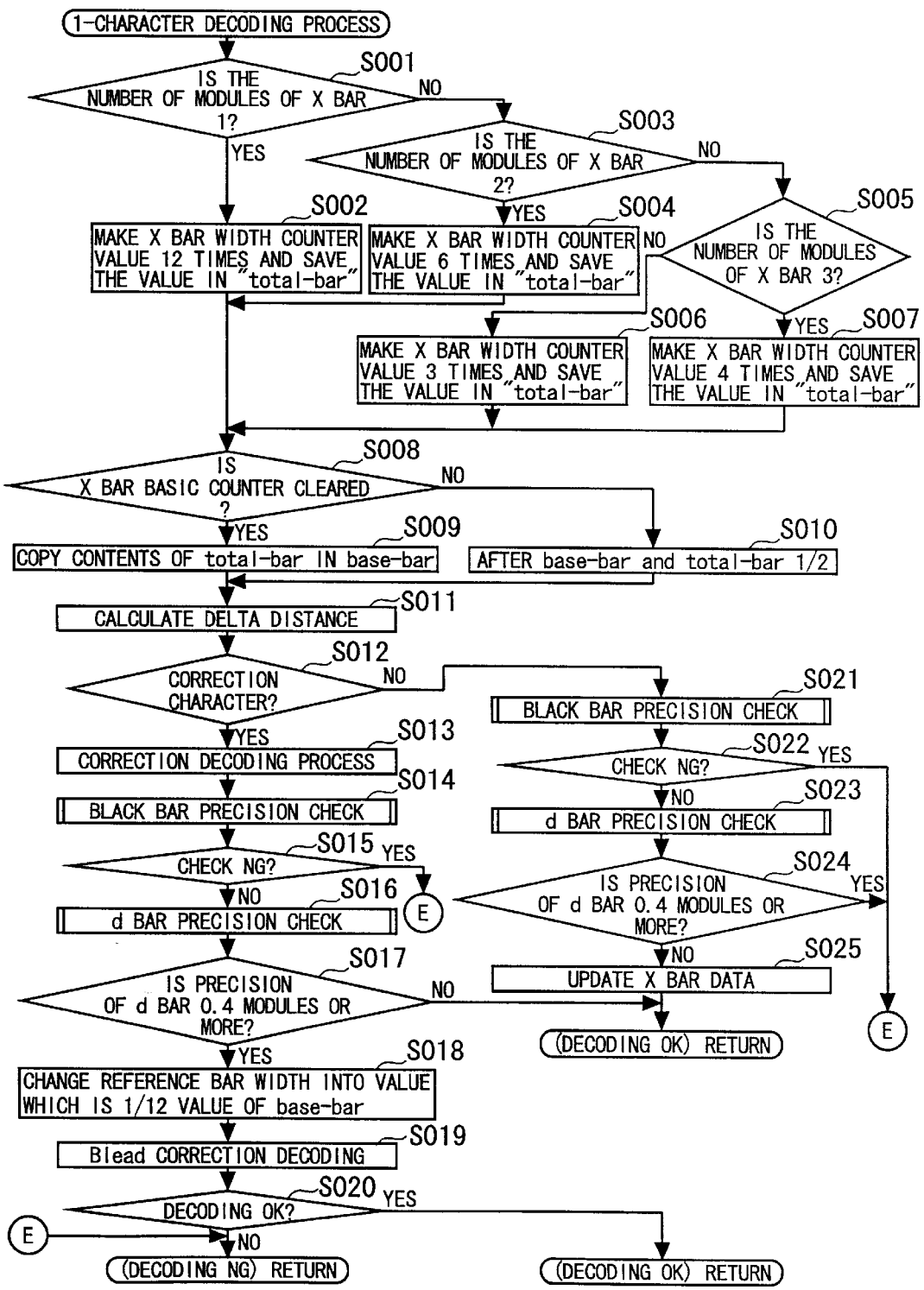
FIG. 4 is a flow chart showing a 1-character decoding process shown in FIG. 3.

Subsequently, the CPU 1 executes a sub-routine of the 1-character decoding process shown in FIG. 4 (step S4). In this sub-routine, first, the CPU 1 calculates the number of modules of the X bar stored in the X bar data storage area 33 in the processes in steps S001 to S007. Subsequently, depending on the number of modules, the CPU 1 calculates a value obtained by increasing the X bar width counter value stored in the X bar data storage area 33 by 12 modules. The CPU 1 stores the calculated value in the counter for average value calculation (total-bar) 32 in the RAM 6.

In this case, the bar width counter value of the X bar corresponding to the 12 modules because 12 is the number of modules (1 to 4) of the X bars of the lowest common multiple and because an error is suppressed from being generated by the difference between the numbers of modules of X bars by calculating a bar width counter value per module from the X bar width counter value of the 12 modules.

Upon completion of the processed in steps S001 to S007, the CPU 1 decides whether the X bar basic counter 31 is cleared or not (step S008). At this time, if the X bar basic counter 31 is cleared (S008; Y), the process shifts to step S009; otherwise (S008; N), the process shifts to step S010.

When the process shifts to step S009, the CPU 1 copies the value of the counter for average value calculation 32 in the X bar basic counter 31. In contrast to this, when the process shifts to step S010, the CPU 1 adds a value stored in the X bar basic counter 31 at present and a value stored in the counter for average value calculation 32 to each other, calculates ½ of the addition result, and stores the calculated value in the X bar basic counter 32. By the process in step S010, reference bar width data used in Blead correction decoding (to be described later) is generated.

Upon completion of the process in step S09 or step S10, the CPU 1 calculates delta distances T1 and T2 (see FIG. 2) of c bar and d bar of a character to be decoded (step S11).

Subsequently, the CPU 1 calculates the numbers of modules in the delta distances T1 and T2 and then refers to the first decoding table 61 (see FIG. 12) in the RAM 4. At this time, the CPU 1 decides whether the number of modules of the delta distance T1 is 3 or 4 or not and whether the number of modules of the delta distance T2 is 3 or 4 or not. In this manner, the CPU 1 decides whether the character to be decoded is a character (correction character) which requires correction decoding or not (step S012). If the character to be decoded is the correction character (S012; Y), the process shifts to step S013; otherwise (S012; N), the CPU 1 reads character values corresponding to the delta distances T1 and T2 from the first decoding table 61, and the process shifts to step S021.

When the process shifts to step S013, the CPU 1 performs the correction decoding described in the prior art by using data related to the X bar held in the X bar data storage area 33. In this manner, the numbers of modules of the b bar and the d bar of the character to be decoded are corrected. The CPU 1 refers to the second decoding table 62 (see FIG. 13) of the RAM 4 to read the character value corresponding to the number of modules of the d bar after the correction from the second decoding table 62. In this manner, the value of the character to be decoded is specified. More specifically, the character to be decoded is decoded.

Figure 5:
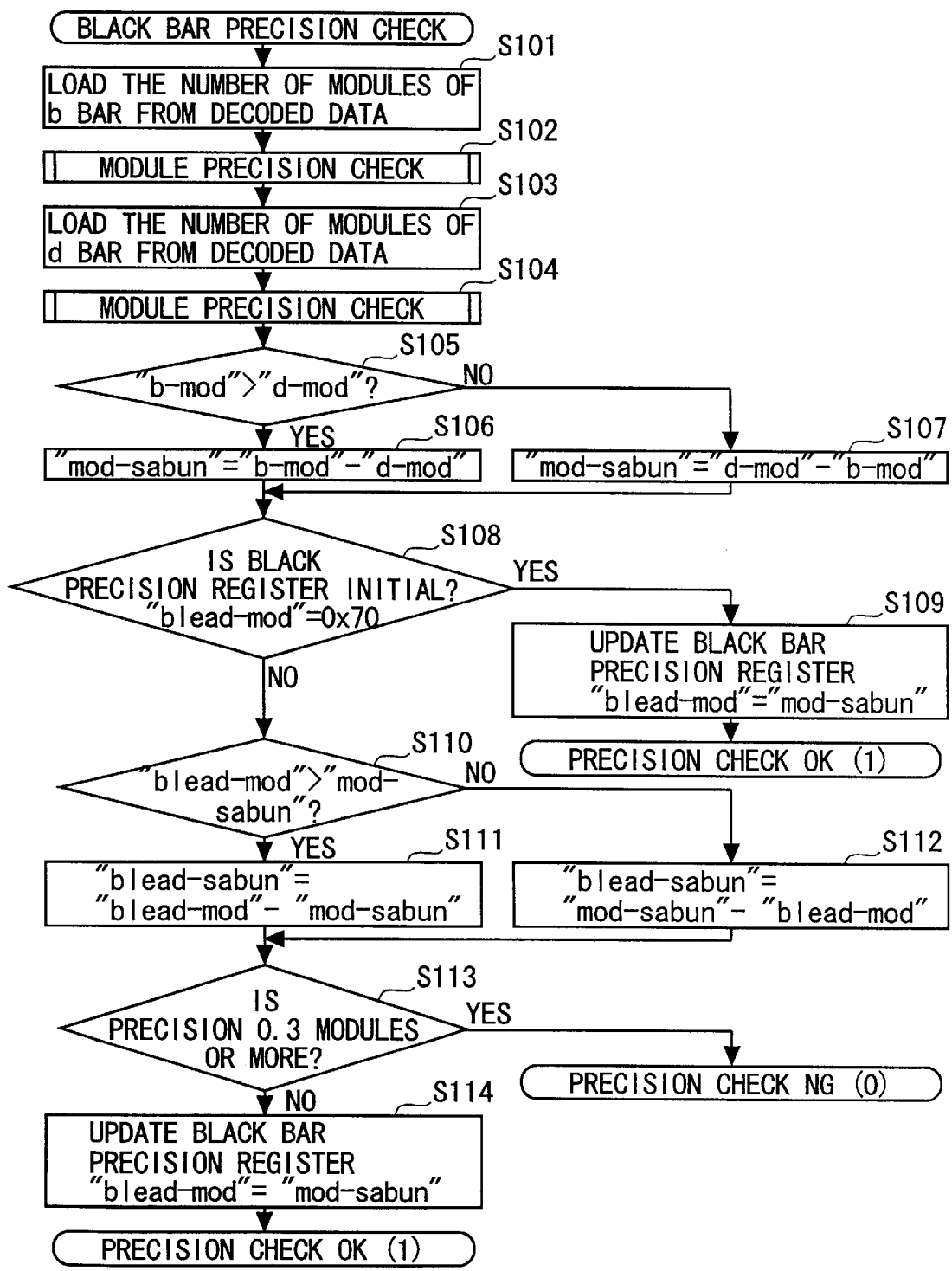
FIG. 5 is a flow chart showing the black bar precision check process shown in FIG. 4.

Upon completion of the process in step S013, the CPU 1 executes the sub-routine of the black bar precision check process shown in FIG. 5 (step S014). In the sub-routine shown in FIG. 5, the CPU 1, first, reads the number of modules of the b bar obtained by the process in step S013 (step S101). Subsequently, the CPU 1 executes the module precision (error) check process shown in FIG. 6 (step S102).

Figure 6:
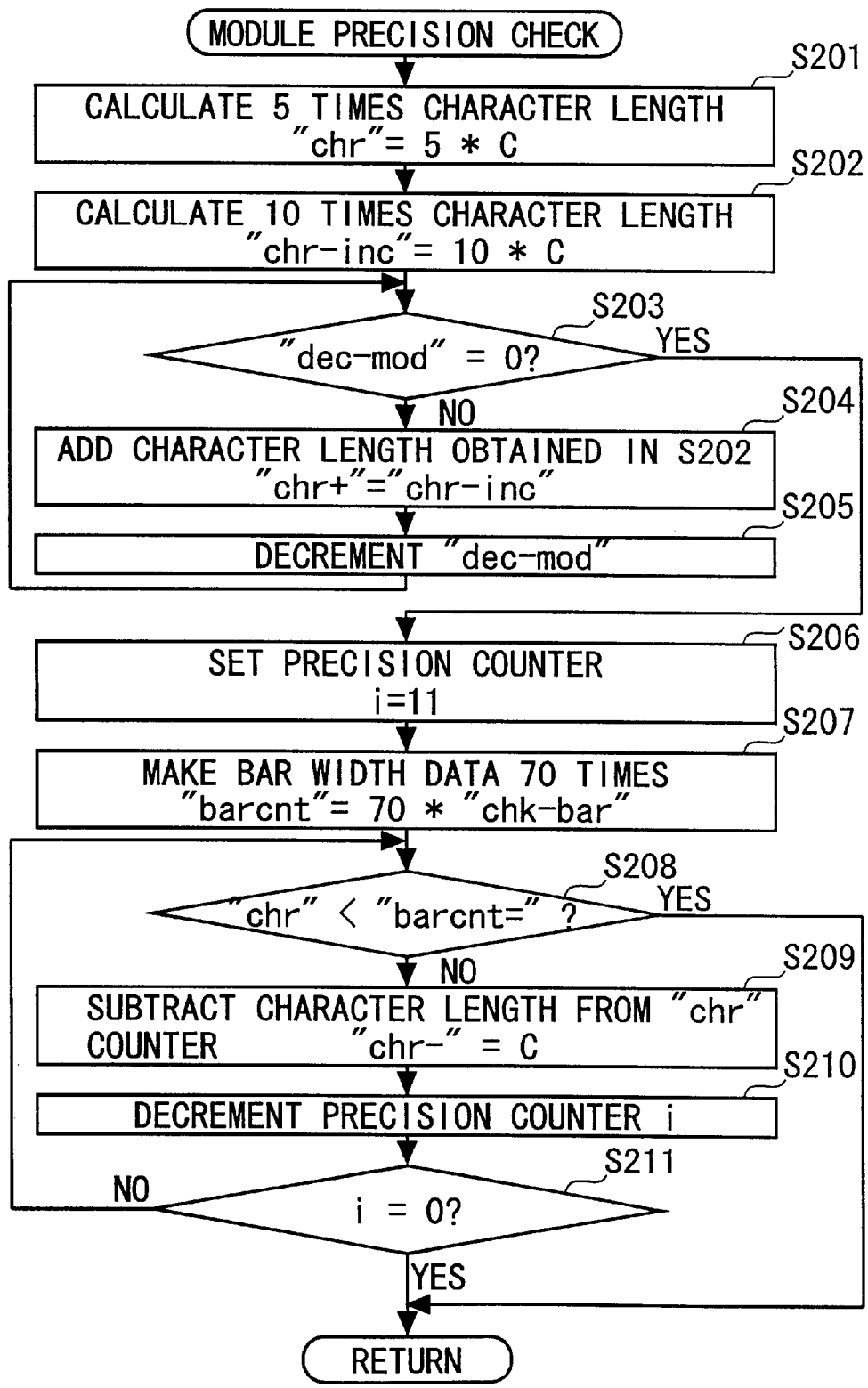
FIG. 6 is a flow chart showing the module decision check process shown in FIG. 5.

In the sub-routine shown in FIG. 6, the CPU 1 prepares the number of modules of the b bar (dec-mod), the bar width data (chk-bar) of abar (in this case, the b bar) for performing module precision check, and the character length (C) of a character to be decoded as arguments.

Figure 8:
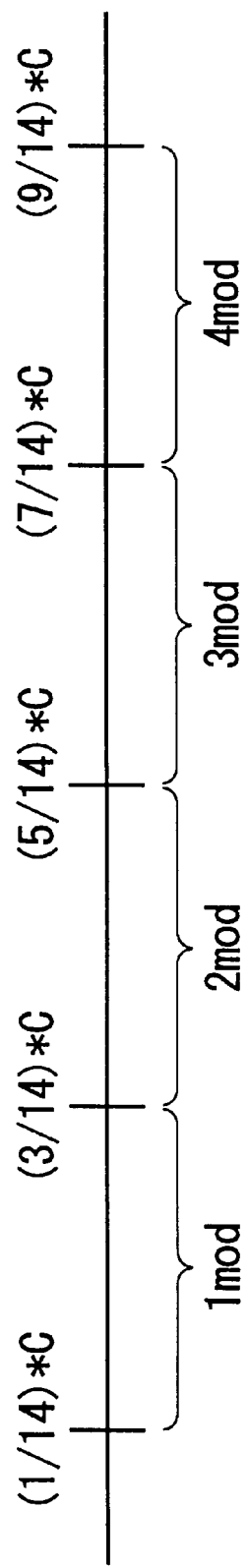
FIG. 8 is a diagram showing the relationship between a character length and the number of modules in this embodiment.

In this embodiment, as shown in FIG. 8, a length which is $\frac{1}{14}$ or more the character length and $\frac{3}{14}$ or less the character length is decided as 1 module, and a length which is larger than $\frac{3}{14}$ the character length and is $\frac{5}{14}$ or less the character length is decided as 2 modules, a length which is larger than $\frac{5}{14}$ the character length and is $\frac{7}{14}$ or less the character length is decided as 3 modules, and a length which is larger than $\frac{7}{14}$ the character length and is $\frac{9}{14}$ or less the character length is decided by 4 modules. In the module precision check process, as will be described later, a value which is ten times the number of modules is used to improve the check precision.

In FIG. 6, the CPU 1 makes the character length of the character to be decoded five times (step S201). Subsequently, the CPU 1 makes the character length of the character to be decoded ten times (step S202).

The CPU 1 decides whether the argument dec-mod (the number of modules of the b bar) is 0 or not (step S203). At this time, when the argument dec-mod is 0 (S203; Y), the process shifts to step S206. When the argument dec-mod is not 0 (S203; N) the process shifts to step S204.

When the process shifts to step S204, the CPU 1 adds the value obtained in step S201 and the value obtained in step S202 to each other. The CPU 1 decrements the value of the argument dec-mod by 1 (step S205), and the process is returned to step S203. In the processes in step S201 to S205, the CPU 1 calculates a value (comparative value) obtained by multiplying the character length of the character to be decoded depending on the number of modules of the b bar. More specifically, the CPU 1 calculates a value obtained by making the character length 15 times when the number of modules of the b bar is 1, the CPU 1 calculates a value obtained by making the character length 25 times when the number of modules is 2, the CPU 1 calculates a value obtained by making the character length 35 times when the number of modules is 3, and the CPU 1 calculates a value obtained by making the character length 45 times when the number of modules is 4.

Figure 9:
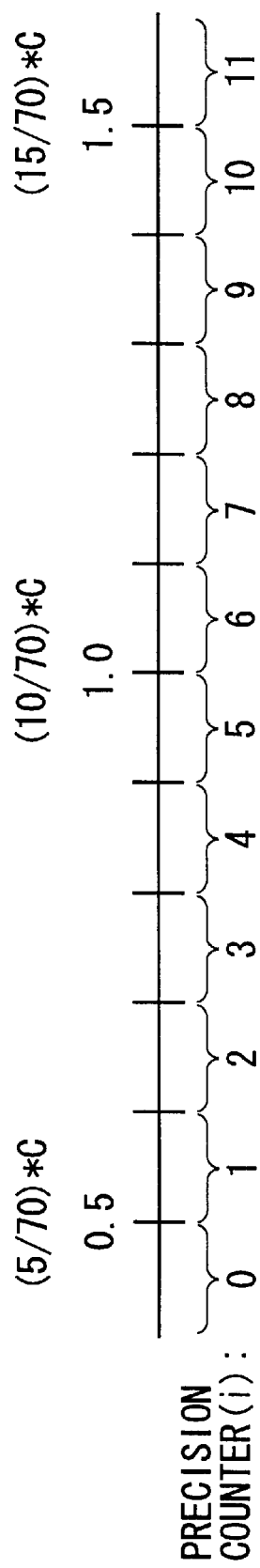
FIG. 9 is a diagram for explaining a precision counter in the module precision check process shown in FIG. 6.

When the process shifts to step S206, the CPU 1 sets the value of a precision counter i shown in FIG. 9 to be 11. The precision counter i shown in FIG. 9 is used when the number of modules is 1, and employs any value of 1 to 10 depending on a scale (range decided as 1 module) in which 1 module of the X bar is set to be 1.0 (reference) and which extends from 0.5 modules to 1.5 modules. For example, in the range from 0.5 modules ($5/10$ the character length) to 0.6 modules, the precision counter i satisfies i=1. In the range from 1.0 module ($10/10$ the character length) to 1.1 modules, the precision counter i satisfies i=6. In the range from 1.4 modules to 1.5 modules ($15/10$ the character length), the precision counter i satisfies i=10. In contrast to this, when the number of modules is 2, the precision counter i employs any value of 1 to 10 in a scale extending from 1.5 modules to 2.5 modules. When the number of modules is 3, the precision counter i employs any value of 1 to 10 in a scale extending from 2.5 modules to 3.5 modules. When the number of modules is 4, the precision counter i employs any value of 1 to 10 in a scale extending from 3.5 modules to 4.5 modules.

Subsequently, the CPU 1 calculates a value (barcnt) obtained by making the argument chk-bar (bar width counter value of the b bar) 70 times (step S207). Subsequently, the CPU 1 decides whether the comparative value calculated in steps S201 to S205 is larger than the value of the barcnt calculated in step S207 or not (step S208). At this time, when the comparative value is larger than the value of the barcnt (S208; Y), the CPU 1 calculates the module precision of the b bar depending on the value of the precision counter i and ends the sub-routine of the module precision check process.

In contrast to this, when the comparative value is the value of the barcnt or less (S208; N), the CPU 1 subtracts the character length from the comparative value (step S209), and decrements the value of the precision counter i by 1 (step S210). Then, the CPU 1 decides whether the value of the precision counter i is 0 or not (Step S211). When the precision counter i is 0 (S211; Y), the sub-routine of the module precision check process is ended. When the precision counter i is not 0 (S211; N), the process returns to step S208.

In this manner, the CPU 1 calculates the value of the precision counter i in steps S206 to S211, so that the module precision of the b bar is calculated. For example, as a result of the correction decoding process in step S013, it is assumed that the character to be decoded is an odd number "1" (0011001) and that the number of modules of the b bar is 2. In addition, for example, it is assumed that the bar width data (counter value) of the b bar is 210 and that the character length (count value) of the character to be decoded is 700.

In this case, in steps S201 to S205, a value=17500 which is obtained by making the character length 25 times is calculated as a comparative value. In step S207, a value=14700 of the barcnt is calculated. In the loop process in steps S208 to S211, the precision counter i=7 is calculated. In this example, when the precision counter i is 7, the number of modules of the b bar is 2.1 modules. Therefore, the CPU 1 calculates a value obtained by extracting the value of the decimal part from the number of modules of the b bar, i-e., 0.1 module as the module precision (b-mod) of the b bar, ends the module precision check process, and returns the process to the black bar precision check process (see FIG. 5). In the module precision check process, independently of the number of modules of a bar to be checked (b bar, in this case), the decimal part of the number of modules corresponding to the precision counter is calculated as a module precision.

Thereafter, the CPU 1 shifts the process to step S103 shown in FIG. 5. In step S103, the CPU 1 reads the number of modules of the d bar obtained in step S013. Subsequently, the CPU 1 performs the number of modules check process about the d bar shown in FIG. 6, and calculates the module precision (d-mod) of the d bar (step S104).

The CPU 1 decides whether b-mod is larger than d-mod or the like (step S105). At this time, when b-mod is larger than d-mod (S105; Y), the CPU 1 calculates a value obtained by subtracting d-mod from b-mod as mod-sabun and shifts the process to step S108. In contrast to this, when b-mod is smaller than d-mod (S105; N), the CPU 1 calculates a value obtained by subtracting b-mod from d-mod as mod-sabun, and shifts the process to step S108.

When the process shifts to step S108, the CPU 1 decides whether the black bar precision register (blead-mod) 34 is initial or not. At this time, when the black bar precision register 34 is initial (S108; Y), the CPU 1 shifts the process to step S110. When the black bar precision register 34 is not initial (S108; N), the CPU 1 updates the contents of the black bar precision register 34 by using the value of mod-sabun calculated in step S106 or S107 (step S109), determines that the black bar precision check result is OK, and ends the black bar precision check process.

On the other hand, when the process shifts to step S110, the CPU 1 decides whether the value of the black bar precision register (blead-mod) 34 is larger than the value of mod-sabun or not(step S110). At this time, when blead-mod is larger than mod-sabun (S110; Y), the CPU 1 calculates a value obtained by subtracting mod-sabun from blead-mod as blead-sabun, and shifts the process to step S113. In contrast to this, when blead-mod is smaller than mod-sabun (S110; N), the CPU 1 calculates a value obtained by subtracting blead-mod from mod-sabun as bread-sabun, and shifts the process to step S113.

When the process shifts to step S113, the CPU 1 decides whether the difference between a module precision b-mod of the b bar and a module precision d-mod of the d bar is 0.3 modules or more or not. More specifically, the CPU 1 decides whether the value of blead-mod is 0.3 modules or more or not. At this time, when the value of blead-mod is 0.3 or more (S113; Y), the CPU 1 determines that the black bar precision check result is NG, and ends the black bar precision check process. In contrast to this, when the value of blead-mod is smaller than 0.3 modules (S113; N), the CPU 1 updates the black bar precision register 34 by using the value of mod-sabun calculated in step S106 or S107 (step S114), determines that the black bar precision check result is OK, and ends the black bar precision check process. In this manner, when the precision difference between the b bar and the d bar is ±0.3 modules or more, the CPU 1 decides that the black bar precision is NG. When the precision difference is smaller than ±0.3 modules, the CPU 1 decides that the black bar precision is OK. Thereafter, the CPU 1 shifts the process to step S015 shown in FIG. 4.

When the process shifts to step S015, the CPU 1 decides whether the black bar precision check result is NG or not. At this time, when the check result is NG (S115; Y), the CPU 1 decides that a decoding process of a character to be decoded is NG, and ends a 1-character decoding process. In contrast to this, when the check result is OK (S115; N), the CPU 1 shifts the process to step S116.

Figure 7:
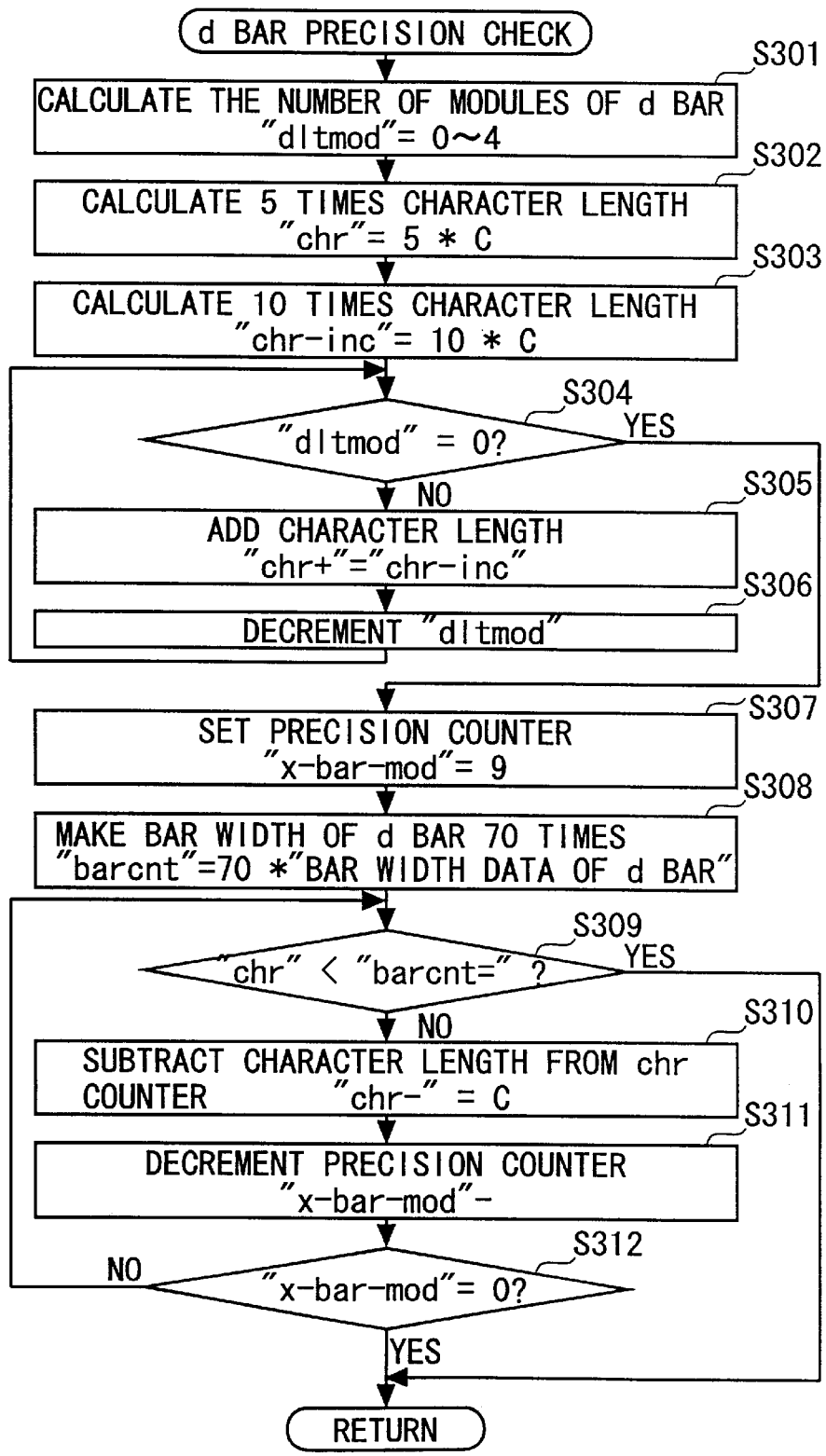
FIG. 7 is a flow chart showing a d bar precision check process shown in FIG. 4.

In step S116, the CPU 1 executes the sub-routine of the d bar precision check process shown in FIG. 7. In FIG. 7, the CPU 1, first, calculates the number of modules (dlmod; 0 to 4) of the d bar (step S301). In steps S302 to S306, the CPU 1 performs a process which is almost equal to the process in steps S201 to S205 (see FIG. 6) to obtain a comparative value depending on the number of modules of the d bar.

More specifically, when the number of modules of the d bar is 1, a comparative value obtained by making the character length of the character to be decoded 15 times is calculated. When the number of modules of the d bar is 2, a comparative value obtained by making the character length of the decoding character 25 times is calculated. When the number of modules of the d bar is 3, a comparative value obtained by making the character length of the decoding character 35 times is calculated. When the number of modules of the d bar is 4, a comparative value obtained by making the character length of the decoding character 45 times is calculated. The comparative values are set in a chr counter (not shown).

Figure 10:
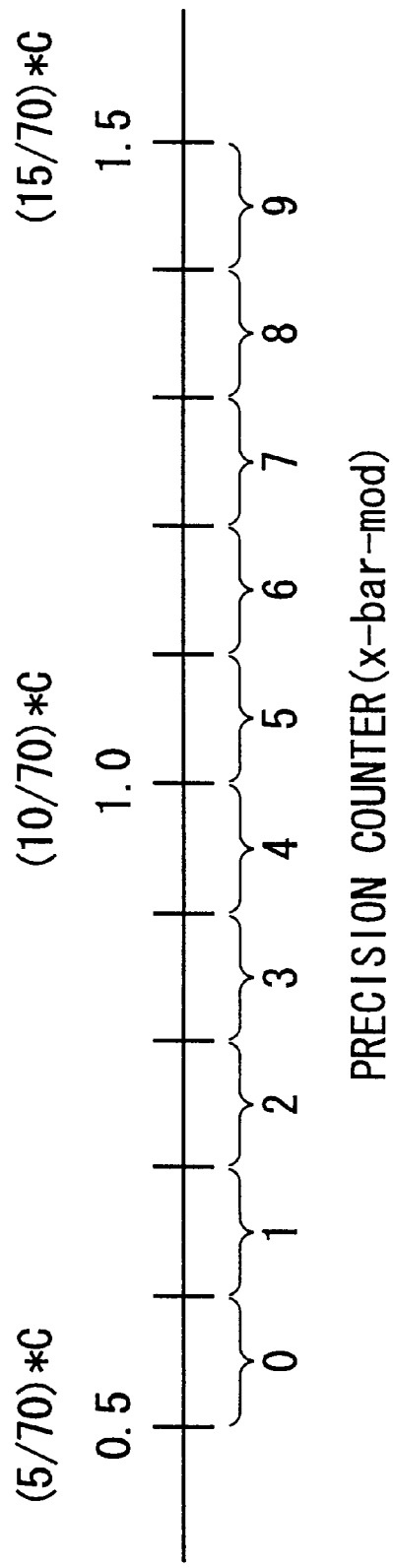
FIG. 10 is a diagram for explaining a precision counter in the d bar precision check process shown in FIG. 7.
Figure 11:
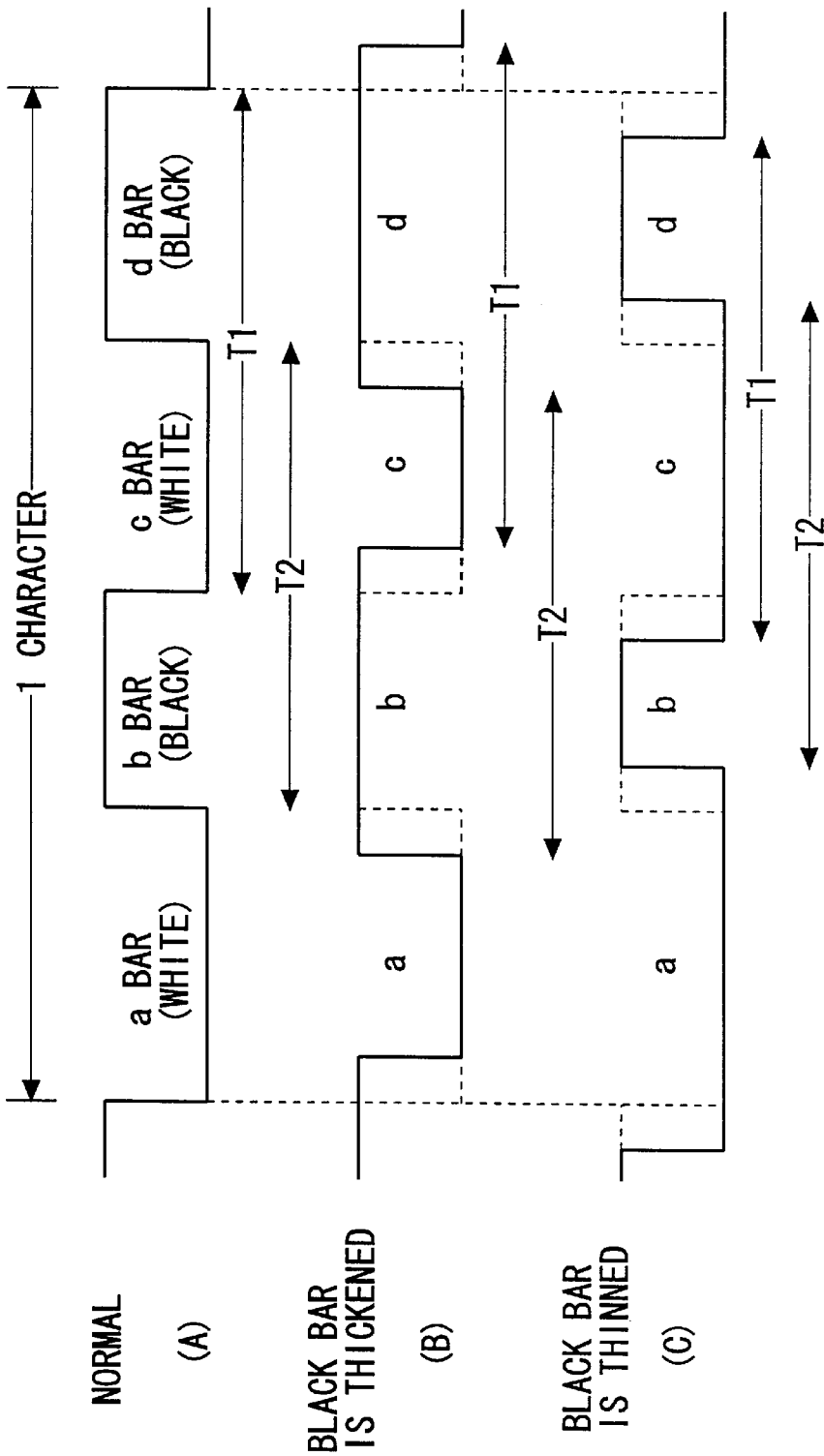
FIG. 11 is a diagram for explaining a delta distance by thickening and thinning of a black bar.

The CPU 1 sets the value of a precision counter x-bar-mod shown in FIG. 10 to be 9 (step S307). As shown in FIG. 10, for example, when the number of modules of the d bar is 1, the precision counter x-bar-mod employs any value of 0 to 9 depending on a scale in which 1 module of the X bar is set to be 1.0 (reference) and which extends from 0.5 modules to 1.5 modules. For example, when the counter value of the precision counter x-bar-mod is 1, the number of modules is 0.6 modules. When the counter value is 9, the number of modules is 1.4 modules.

The CPU 1 calculates a value obtained by making the bar width counter value of the d bar 70 times as barcnt (step S308). The CPU 1 decides whether the value of barcnt is larger than the comparative values calculated in steps S302 to S306 or not (step S309). At this time, when the value of barcnt is larger than the comparative values (S309; Y), the CPU 1 calculates the module precision of the d bar corresponding to the counter value of the precision counter x-bar-mod, and ends the d bar precision check process. In contrast to this, the value of barcnt is smaller than the comparative values (S309; N), the CPU 1 subtracts the character length from the value (comparative value) of the chr counter (step S310), and decrements the value of the precision counter x-bar-mod by 1 (step S311).

Thereafter, the CPU 1 decides whether the counter value of the precision counter x-bar-mod is 0 or not (step S312). At this time, when the counter value is 0 (S312; Y), the CPU 1 ends the d bar precision check process. In contrast to this, when the counter value is not 0 (S312; N), the CPU 1 returns the process to step S309. In this manner, in steps S307 to S312, the CPU 1 obtains the module precision of the d bar depending on the value of the precision counter x-bar-mod.

Thereafter, the CPU 1 ends the d bar precision check process, and returns the process to step S017 (see FIG. 4) of the 1-character decoding process.

When the process shifts to step S017, the CPU 1 decides whether the module precision of the d bar obtained in the d bar precision check process is 0.4 modules or more or not (step S017) At this time, when the module precision is smaller than 0.4 (S017; N), the CPU 1 decides that the decoding result in step S013 is OK, and ends the 1-character decoding process. In contrast to this, when the module precision is 0.4 or more (S017; Y), the CPU 1 shifts the process to step S018.

Figure 14:
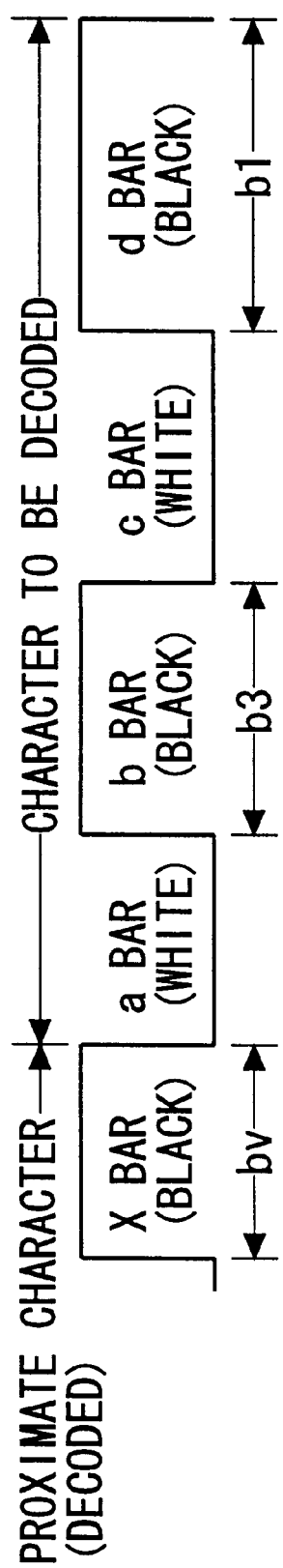
FIG. 14 is a diagram for explaining a conventional correction decoding process.

When the process shifts to step S018, the CPU 1 changes reference bar width data (bv shown in FIG. 14) used in correction decoding from the bar width of the X bar to the value (average value of the X bar) of the X bar basic counter (base-bar) 31. For this reason, the CPU 1 calculates a value which is $\frac{1}{12}$ the value of base-bar. Thereafter, the CPU 1 performs a correction decoding process (Blead correction decoding process) using the value which is $\frac{1}{12}$ the value of base-bar as a reference bar width (step S019). In this manner, the character value corresponding to the number of modules of the d bar after the correction is read from the second decoding table 62, and a character to be decoded is decoded by the character value.

Thereafter, the CPU 1 decides whether the result of the decoding process in step S019 is OK or not (step S020). At this time, when the decoding result is OK (S020; Y), the CPU 1 ends the 1-character decoding process by the process result that the decoding result is OK. In contrast to this, when the decoding result is NG (S020; N), the CPU 1 ends the 1-character decoding process by the process result that the decoding result is NG.

In this manner, first, the CPU 1 performs a correction decoding process using the X bar to a correction character. When the precision difference between the X bar and the d bar in this case is 0.4 modules or more, the correction decoding process is performed by using a value which is $\frac{1}{12}$ the value of base-bar as a reference bar width (bv). In this manner, the character can be appropriately decoded even though the black bars of the bar code 21 are locally thickened or thinned.

When the process shifts to step S021, the CPU 1 performs a process which is almost equal to the process in steps S014 to S017 is performed in step S021 to S024. When NO is decided in step S024, the CPU 1 updates the contents of the X bar data storage area 33 by using the counter value of the d bar decoded in this process and the number of modules (step S025). In this manner, the data of the d bar is used as the data of the X bar in a correction decoding process for the next character to be decoded.

Upon completion of the 1-character decoding process, the CPU 1 shifts the process to the step S5 of the main routine (see FIG. 3). In step S5, the CPU 1 decides whether the decoding result obtained by the 1-character decoding process is OK or not. At this time, when the decoding result is NG (S5; N), the CPU 1 determines that effective decoded data cannot be obtained, the CPU 1 ends the bar code decoding process. In this case, the CPU 1 reads bar code data in another scanning trace from the RAM 4 or the bar width data storage buffer 2, and performs the bar code decoding process.

In contrast to this, when the decoding result is OK (S5; Y), the CPU 1 decides whether decoding processes for all effective characters included in the bar code data which is processed in the current bar code decoding process are ended or not (step S6). At this time, when the decoding processes for all the effective characters are not ended (step S6; N), the CPU 1 returns the process to step S3, performs a 1-character decoding process for the next character, and executes a loop process in steps S3 to S6 until YES is decided in step S6. When the decoding processes for all the effective characters are ended (S6; Y), the CPU 1 determines that effective decoded data can be obtained, and the CPU 1 ends the bar code decoding process.

In this case, the decoded bar code data (decoded bar code data) is stored in the RAM 4. At this time, when the decoded bar code data is decoded data for a part of the bar code 21 (in case of so-called divisional reading or block reading), the CPU 1 executes the above-mentioned bar code decoding process for the bar code data of the remaining part, synthesizes (couples) the obtained decoded bar code data with each other, and obtains decoded data of the entire bar code 21, i.e., all the characters included in the bar code 21.

When the decoded data of the entire bar code 21 are obtained, the CPU 1 executes a modules check process (modules 10 check). Thereafter, when the result of the modules check is OK, an instruction for causing the loudspeaker 10 to output voice representing that decoding of the bar code 21 is given to the control section circuit 3, and an instruction for displaying information based on the character value of the bar code 21 on the LED 11 is given to the control section circuit 3. In addition, the CPU 1 transfers the contents of the decoded bar code data (or information corresponding thereto) to the upper-level machine (POS) 201 through the interface circuit 4. On the other hand, when the decoded data of the entire bar code 21 cannot be obtained, the CPU 1 gives an instruction for performing an error display to the control section circuit 3. In this manner, the loudspeaker 10 outputs voice representing a read error, and the LED 11 displays the read error.

<Operation of Embodiment>

According to the bar code reader described above, in the 1-character decoding process (see FIG. 4), when the precision difference (error) between the X bar and the d bar is 0.4 modules or more, correction decoding (bar width correction) of a bar subjected to correction decoding is performed by using an average value of the X bar. When the error is smaller than 0.4 modules, correction decoding (bar width correction) of the bar subjected to correction decoding is performed by using the bar width of the X bar. For this reason, even though the black bars of the bar code 21 are locally thickened or thinned, the correction decoding can be appropriately performed. For this reason, the bar code 21 can be prevented from being misread.

This embodiment describes an example in which the apparatus for correcting a bar width and the method for correcting a bar width according to the present invention are applied to the correction decoding process. However, the apparatus and the correcting method according to the present invention are not limited to this embodiment, and can be widely performed with respect to bar width correction for bar codes.

In this embodiment, although the bar code 21 according to UPC/A and EAN-13 of WPC code is used, the apparatus for correcting a bar width and the bar code reader according to the present invention can be widely used for the overall WPC code. Although the threshold value in step S017 shown in FIG. 4 is 0.1 module, this threshold value can be properly changed.

According to the bar width correcting apparatus and the bar width correcting method according to the present invention, when an error between the bar width of the bar to be corrected and the reference bar width is a predetermined value or more, the bar width of the bar to be correction is corrected by using the average bare widths. For this reason, even though the bar widths of the bar code are not uniformly thickened or thinned, the bar widths can be appropriately corrected, and the bar code can be prevented from being misread.

According to the bar code reader and the bar code decoding method according to the present invention, in the decoding process for a character, when the difference between the precision of reference bars and the precision of a black bar subjected to correction decoding is a predetermined value or more, a correction decoding process is performed by using the average value of the bar widths of the reference bars. For this reason, even though the black bars of the bar code are locally thickened or thinned, a character can be appropriately decoded in comparison with conventional correction decoding. Therefore, in comparison of the conventional technique, a decoding mistake of a character in the correction decoding can be suppressed, and the bar code can be prevented from being misread.

What is claimed is:

1. An apparatus for correcting a bar width comprising:
   a detecting section for calculating a reference bar width serving as a reference of bar widths;
   a first calculation section for calculating an average value of a plurality of reference bar widths;
   a second calculation section for calculating an error value between a bar width of a bar to be corrected and the reference bar width calculated by the detecting section; and
   a correcting section for correcting the bar width of the bar to be corrected by using the calculated average value when the calculated error value is not less than a predetermined value and for correcting the bar width of the bar to be corrected by the calculated reference bar width when the calculated error value is less than the predetermined value.

2. A method for correcting a bar width of a bar constituting a character to be decoded by using a bar width of a bar constituting a decoded character as a reference bar, comprising:
   calculating a reference bar width;
   calculating an average value of a plurality of reference bar widths;
   calculating an error value between a bar width of a bar to be corrected constituting the character to be decoded and the calculated reference bar width; and
   correcting the bar width of the bar to be corrected on the basis of the calculated average value when the calculated error value is not less than a predetermined value.

3. A bar code reader comprising:
   a bar code data detecting section for scanning a bar code having a plurality of characters to detect bar code data; and
   a decoding section for decoding the bar code data detected by the bar code data detection section every character, the decoding section comprising:
   a first detecting section for calculating a reference bar width serving as the reference of the width of a bar to be corrected included in a character to be decoded and used in decision of the character in decoding of each character;
   an second detecting section for calculating an average value of a plurality of reference bar widths;
   a third detecting section for calculating a precision difference between the reference bar width and the bar width of the bar to be corrected; and a correcting section for correcting the bar width of the bar to be corrected by using the calculated average value when the calculated precision difference is not less than a predetermined value.

4. A bar code reader according to claim 3, wherein the decoding section further comprises a correction decoding table in which a character value corresponding to the number of modules of a bar to be corrected is stored, and the correcting section calculates the number of modules of the bar to be corrected after the correction and reads a character value corresponding to the number of modules from the correction decoding table.

5. A bar code reader according to claim 4, wherein the decoding section further comprising:
- a delta distance calculating section for calculating the number of modules in a first delta distance which is a width from a first black bar to a white bar adjacent to the first black bar in a character to be decoded and the number of modules in a second delta distance which is a width from the white bar to a second black bar adjacent to the white bar;
- a decoding table in which character values corresponding to the numbers of modules in the first delta distance and the second delta distance are stored; and
- a second correcting section for, when the two character values corresponding to the numbers of modules calculated by the delta distance calculation section are stored in the decoding table, making the first black bar the bar to be corrected, correcting the bar width of the bar to be corrected by using the reference bar width data, and calculating the number of modules of the bar to be corrected after the correction, and
- the third detecting section calculates the precision difference between the bar width of the bar to be corrected by the second correction section and the reference bar width.

6. A bar code reader according to claim 5, wherein the second correcting section corrects the bar width of the second black bar by using the reference bar width, the decoding section further comprises a black bar precision difference detecting section for calculating the precision difference between the bar width of the first black bar corrected by the second correction section and the bar width of the second black bar, and the third detecting section starts the process when the precision difference obtained by the black bar precision difference detecting section is less than a predetermined value.

7. A method for decoding a bar code for a bar code reader comprising a bar code data detecting section for scanning a bar code having a plurality of characters to detect bar code data, and a decoding section for decoding the bar code data detected by the bar code data detection section every character, the method comprising:

- a first step of calculating a reference bar width serving as the reference of the width of a bar to be corrected included in a character to be decoded and used in decision of the character;
- a second step of calculating an average value of a plurality of reference bar widths;
- a third step of calculating a precision difference between the reference bar width and the bar width of the bar to be corrected; and
- a fourth step of correcting the bar width of the bar to be corrected by using the calculated average value when the calculated precision difference is not less than a predetermined value.

8. A method for decoding a bar code according to claim 7, wherein the fourth step calculates the number of modules of the bar to be corrected after the correction and reads a character value corresponding to the number of modules from a table in which the number of modules of the bar to be corrected and a character value are stored in correspondence with each other.

9. A method for decoding a bar code according to claim 8, further comprising:

- a fifth step of calculating the number of modules in a first delta distance which is a width from a first black bar to a white bar adjacent to the first black bar in a character to be decoded and the number of modules in a second delta distance which is a width from the white bar to a second black bar adjacent to the white bar; and
- a sixth step of, when the two character values corresponding to the numbers of modules calculated by the fifth step exist, making the first black bar the bar to be corrected, correcting the bar width of the bar to be corrected by using the reference bar width data, and calculating the number of modules of the bar to be corrected after the correction, and wherein the fourth step calculates the precision difference between the bar width of the bar to be corrected by the sixth step and the reference bar width.

10. A method for decoding a bar code according to claim 9, wherein the sixth step further includes the seventh step of correcting the bar width of the second black bar by using the reference bar width and calculating the precision difference between the bar width of the first black bar corrected by the sixth step and the bar width of the second black bar, and the fourth step starts the process when the precision difference obtained by the seventh step is less than a predetermined value.

* * * * *